United States Patent
Polasa et al.

(10) Patent No.: US 11,150,719 B1
(45) Date of Patent: Oct. 19, 2021

(54) SYSTEM AND METHOD FOR IMPLEMENTING LOW-POWER, LOW CODE-SIZE POWER-DELIVERY COMMUNICATION PROTOCOL ON SINGLE AND MULTIPLE USB-C PORTS

(71) Applicant: SILICONCH SYSTEMS PVT LTD, Karnataka (IN)

(72) Inventors: Rakesh Kumar Polasa, Karnataka (IN); Shubham Paliwal, Uttar Pradesh (IN); Kaustubh Kumar, Uttar Pradesh (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 0 days.

(21) Appl. No.: 16/923,738

(22) Filed: Jul. 8, 2020

(30) Foreign Application Priority Data

Mar. 24, 2020 (IN) .............................. 202041012762

(51) Int. Cl.
  *G06F 1/32* (2019.01)
  *G06F 1/324* (2019.01)
  *G06F 1/3234* (2019.01)
  *G06F 1/3228* (2019.01)
  *G06F 1/3215* (2019.01)

(52) U.S. Cl.
  CPC ............ *G06F 1/324* (2013.01); *G06F 1/3215* (2013.01); *G06F 1/3228* (2013.01); *G06F 1/3253* (2013.01)

(58) Field of Classification Search
  CPC ...... G06F 1/324; G06F 1/3228; G06F 1/3253; G06F 1/3215
  USPC ......................................................... 713/322
  See application file for complete search history.

(56) References Cited

U.S. PATENT DOCUMENTS

| | | | |
|---|---|---|---|
| 9,914,548 B1 * | 3/2018 | Vadillo | ................... B64D 41/00 |
| 10,387,345 B2 | 8/2019 | Waters | |
| 2008/0162737 A1 * | 7/2008 | Liu | ........................ G06F 3/0613 710/8 |

(Continued)

OTHER PUBLICATIONS

Universal Serial Bus Type-C Cable and Connector Specification Release 2.0, USB 3.0 Promoter Group, Aug. 2019 (373 pages).

(Continued)

*Primary Examiner* — Chun Cao
(74) *Attorney, Agent, or Firm* — Procopio, Cory, Hargreaves & Savitch LLP

(57) ABSTRACT

Systems involve a dividing unit configured to divide functionality in digital hardware portion through finite state machines (FSMs), protocol timers and PD message accelerator blocks for reducing code size such that their implementation combined with a low code-size firmware (FW) interacts, using a control unit operatively coupled to the dividing unit, with the hardware portion to provide updates in an USB-PD specification, wherein at least one of the FSMs configured to run at a predefined UI clock frequency to enable low active power to the system, a wake-up unit running at least on 4 times of UI clock frequency and detects data edge on configuration channel line to wake-up the entire system from sleep state, wherein a plurality of standard power saving mechanisms selected from clock gating and frequency reduction for clocks are implemented to enable low power corresponding to the system and bypass paths at each level of implementation.

16 Claims, 9 Drawing Sheets

(56) References Cited

U.S. PATENT DOCUMENTS

| | | | |
|---|---|---|---|
| 2010/0275037 A1* | 10/2010 | Lee | G06F 13/385 |
| | | | 713/189 |
| 2017/0147052 A1* | 5/2017 | Waters | G06F 1/266 |
| 2018/0356873 A1* | 12/2018 | Regupathy | G06F 1/3287 |
| 2019/0138078 A1* | 5/2019 | Regupathy | G06F 1/266 |

OTHER PUBLICATIONS

Universal Serial Bus Power Delivery Specification, Revision 3.0, Version 2.0, Aug. 29, 2019 (657 pages).

* cited by examiner

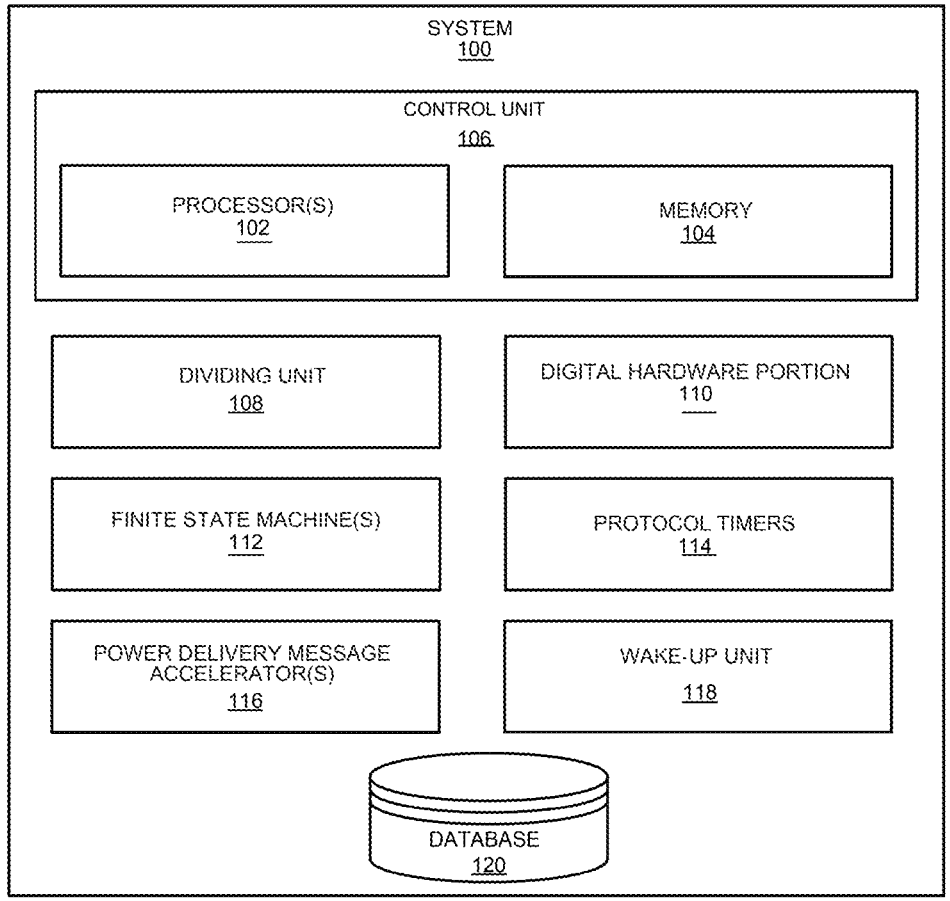

FIG. 1

DIVIDING, USING A DIVIDING UNIT, FUNCTIONALITY IN A DIGITAL HARDWARE PORTION THROUGH AT LEAST ONE BLOCK SELECTED FROM FINITE STATE MACHINES (FSMS), PROTOCOL TIMERS AND POWER DELIVERY (PD) MESSAGE ACCELERATOR BLOCKS FOR REDUCING CODE SIZE SUCH THAT AN IMPLEMENTATION OF THE AT LEAST ONE SELECTED BLOCK COMBINED WITH A LOW CODE SIZE FIRMWARE (FW) INTERACTS, USING A CONTROL UNIT OPERATIVELY COUPLED TO THE DIVIDING UNIT, WITH THE HARDWARE PORTION TO FACILITATE COMPATIBILITY WITH FUTURE UPDATES IN USB-PD SPECIFICATION, WHEREIN AT LEAST ONE OF THE FSMS CONFIGURED TO RUN AT A PREDEFINED UI CLOCK FREQUENCY (OF 300 KHZ) TO ENABLE LOW ACTIVE POWER TO THE DIGITAL HARDWARE PORTION, AND WHEREIN A PLURALITY OF STANDARD POWER SAVING MECHANISMS SELECTED FROM ANY OR A COMBINATION OF CLOCK GATING AND FREQUENCY REDUCTION FOR CLOCKS ARE IMPLEMENTED TO ENABLE THE SYSTEM TO ENTER INTO A SLEEP STATE BEING DEFINED AS ALL BLOCKS IN THE SYSTEM BEING CLOCK-GATED TO ENABLE LOW POWER UTILISATION IN THE DIGITAL HARDWARE PORTION

FIG. 2

SYSTEM AND METHOD FOR IMPLEMENTING LOW-POWER, LOW CODE-SIZE POWER-DELIVERY COMMUNICATION PROTOCOL ON SINGLE AND MULTIPLE USB-C PORTS

CROSS REFERENCE TO RELATED APPLICATIONS

This Paris Convention Patent application claims benefit under 35 U.S.C. § 119 and claims priority to Indian Patent Application No. IN 202041012762, filed on Mar. 24, 2020, titled "SYSTEM AND METHOD FOR IMPLEMENTING LOW-POWER, LOW CODE-SIZE POWER-DELIVERY COMMUNICATION PROTOCOL ON SINGLE AND MULTIPLE USB-C PORTS", the content of which is incorporated herein in its entirety by reference for all purposes.

TECHNICAL FIELD

The present disclosure relates to systems and methods for providing universal serial bus (USB) interface circuitry and/or power delivery (PD) protocols. More particularly, the present disclosure relates to a system and method for implementing low power, low code size PD communication protocol on a universal serial bus type-C (USB-C) port.

BACKGROUND

Background description includes information that can be useful in understanding the present invention. It is not an admission that any of the information provided herein is prior art or relevant to the presently claimed invention, or that any publication specifically or implicitly referenced is prior art.

Universal Serial Bus (USB) is an industry protocol designed to standardize interfaces between computing devices for communication and for supplying electrical power. The USB protocols have enjoyed widespread adoption in nearly every computing device and have received tremendous support in terms of technology development with well-established and standardized software infrastructure.

Under USB standards, the USB interface implements both data communication and power supply, which is the main differential point from earlier standard serial and parallel interfaces. USB 1.1 mandated power delivery of 2.5W (5V, 500 mA) and USB 3.0 brought this up to 4.5W (5V, 900 mA). Nevertheless, the power capability is only suitable for small devices such as smartphones and digital cameras but remains insufficient to provide the power (typically 20W or more) required by typical notebook computers and monitors. USB Power Delivery (USB PD) corrects this shortcoming by allowing power delivery up to 100W over a single USB cable. Consider, for example, that a 15-inch notebook sinks about 60W, while an A3-grade multifunction printer needs about 30W. Under this PD specification, both can be powered up through a single USB hub based on the condition that both support USB PD. Hence, USB-PD, or USB-C Power Delivery, is a new protocol specification that allows for faster and more flexible charging. It is developed concurrently with USB Type-C(USB-C) which is the physical connection, and it is a subset of the new USB 3.1 standards. USB PD protocol can be used to charge a broad spectrum of battery-powered electronics. This benefits consumers, in particular, because they can use just one lightning-fast charger for their laptops, tablet, smartphones and other devices. USB PD protocol provides bi-directional power provisions, optimizes power management across multiple peripherals by allowing each device to take only the power it requires, and to get more power when required for a given application. USB PD is designed to increase the flexibility of USB, by providing enough power for many more devices, while at the same time still allowing data delivery. It is also even more flexible, due to a couple of changes.

USB-PD notifies that the USB has developed from a data interface capable of supplying limited power to a primary provider of power with a data interface. Many devices, at present, charge or get their power from USB ports contained in laptops, cars, aircraft, or even wall sockets. USB has become a ubiquitous power socket for many small devices such as cell phones, MP3 players and other hand-held devices. Users need USB to fulfil their requirements not only in terms of data but also to provide power to, or charge, their devices simply, often without the need to load a driver, in order to carry out "traditional" USB functions.

Efforts have been made in the related or existing art to provide low power, low code size power delivery protocols on USB-C ports.

In a related art implementation there are USB port controllers and methods of interfacing a host processor with one or more USB ports with the host processor implementing an upper protocol layer and a policy engine for negotiating USB power delivery parameters, in which the USB controller includes a logic circuit implementing a lower protocol layer to provide automatic outgoing data transmission retries independent of the upper protocol layer of the host processor. The controller logic circuit further implements automatic incoming data packet validity verification and acknowledgment independent of the upper protocol layer of the host processor. However, this related art implementation may not provide software and hardware optimization efficiently and may not reduce memory size and processing time as per requirements. Further, the code size for the disclosed method is very big, requiring higher memory.

Therefore, there is a need in the art to provide a reliable system and method for implementing a low power, low code size power delivery (PD) communication protocol on USB-C ports.

SUMMARY

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

It is an object of the present disclosure to provide a system for implementing a low power, low code size power delivery (PD) communication protocol on a USB-C port, with both hardware and software optimization.

It is another object of the present disclosure to provide a method for implementing a low power, low code size power delivery (PD) communication protocol on USB-C port, with reduced memory size and processing time.

It is another object of the present disclosure to provide a reliable, optimized and efficient system and method for implementing a low power, low code size power delivery (PD) communication protocol on a USB-C port.

It is another object of the present disclosure to provide a robust system and method for detection of configuration channel (CC) data traffic in USB interface.

It is another object of the present disclosure to provide an optimized system which can be extended for supporting PD on multiple USB-C port through addition of minimal hardware and firmware.

The present disclosure relates to systems and methods for providing universal serial bus (USB) interface circuitry and/or power delivery (PD) protocols. More particularly, the present disclosure relates to a system and method for implementing low power, low code size PD communication protocols on a universal serial bus type-C(USB-C) port. The system provides reception of bi-phase mark coded (BMC) data on the CC line through a mix of analogue and digital components. The data edge detection happens at the analogue components while data interpretation is handled by the digital components.

This summary is provided to introduce simplified concepts of a system for time bound availability check of an entity, which are further described below in the detailed description. This summary is not intended to identify key or essential features of the claimed subject matter, nor is it intended for use in determining/limiting the scope of the claimed subject matter.

An aspect of the present disclosure pertains to a system for implementing a low power, low code size power delivery (PD) communication protocol on a USB-C port which is configured as Source, Sink, DRP or an eMarker. The system includes a dividing unit that is configured to divide functionality in a digital hardware portion through at least one block selected from finite state machines (FSMs), protocol timers and power delivery (PD) message accelerator blocks for reducing code size such that an implementation of the at least one selected block combined with a low code size firmware (FW) interacts, using a control unit operatively coupled to the dividing unit, with the hardware portion to facilitate compatibility with future updates in USB-PD specification, and wherein at least one of the FSMs can be configured to run at a predefined UI clock frequency (of around 300 KHz) to enable the system to enter into a sleep state being defined as all blocks in the system being clock-gated to enable low power utilisation in the system.

In an embodiment, the system can include a wake-up unit configured to activate the system from the sleep state on detection of data edge on configuration channel, and wherein the wake up unit is configured to run at at least four times of the clock frequency to facilitate quick activation of the system without missing on any data bits.

In another embodiment, the system can include one or more USB-C ports, the system configured for implementation in any or all of the one or more USB-C ports, with addition of suitable hardware required for implementation of said system for the one or more second USB-C ports. In another embodiment, the system can include a hardware router configured to route traffic from control unit to a USB-PD controller of a corresponding USB-C port being used, which helps in accelerating the traffic routing to corresponding USB-C port and reducing the computer code size in a multiport system In another embodiment, the FSM is a type-C FSM such that corresponding at least one termination resistor can be selected from Rp, Rd and Ra is configured to enable controlling of appropriate register by a hardware of the FSM and determine the type-C connection and disconnection detection and orientation.

In another embodiment, the system can include one or more configurable hardware debouncing blocks that are configured to detect source configuration channel (CC) pin selected from any or a combination of Rd (src.Rd), Rp (src.Rp) and Ra (src.Ra) whenever an USB-C port is connected or disconnected, wherein an alert is provided, when the connection or disconnection is detected, to the FW for taking appropriate action.

In another embodiment, the system can include a bypass path through the firmware control to bypass and control a plurality of enables and at least one of Rp, Rd and Ra, and observe status of the firmware to incorporate USB-C specification changes.

In another embodiment, the system can include an optimized policy engine state machine, where multiple functionally similar states are merged into common states, operatively coupled with hooks of the firmware and configured to indicate a received traffic to the firmware, initiation of the USB-PD traffic, from the firmware, on a connected CC line through a protocol layer and a physical layer of the digital hardware portion, wherein a plurality of policy engine timers are optimized and implemented, through a set of hardware timers, VDM sender response timer, no response timer, and wherein message related timers are implemented through a generic, configurable shared timer with a default value loaded from FSM and have a provision to load from firmware, depending on the concurrency of the timers across all the PD message flows.

In another embodiment, the system can include a bypass path with configurable states, configurable transition arcs, configurable shared timers, configurable CC control and configurable expected packets, which transmit data, implemented in the policy engine through the firmware hooks to the policy engine for interacting with the protocol layer directly in case of addition of new messages and flows for future revisions of USB-PD specification.

In another embodiment, the protocol layer with firmware hooks can be configured to: auto-send goodCRC during successful message reception indication from the physical layer, check an identification (ID) of a received message for proper communication; increment a message ID counter on successful transmission after receiving the goodCRC; discard long PD messages; compute and append the message ID during communication with a port partner on the message being transmitted; provide the message formed after appending the message ID to the hardware implemented physical layer for further transmissions, wherein a SinkTx timer, CRC reception timer and hard-reset completion timers from PD specification are implemented through a re-usable timer interface and configurable values from firmware such that reset values of the timers are set to the predefined value of the timers so that the firmware initialization of these timers is not needed, thereby saving code space.

In another embodiment, the system can include a bypass path with the firmware hooks to the protocol layer for interacting with the physical layer directly for adding a message header as required by the physical layer for transmitting and receiving data on the CC lines for debug purposes and for implementing any change across the physical layer.

In another embodiment, the system can include a physical layer with firmware hooks configured to: transmit the USB-PD traffic with a preamble, start-of-packet (SOP), 4B to 5B conversion and end-of-packet (EOP), compute and append CRC on data received from higher layers to be transmitted on the CC line in the bi-phase mark coded (BMC) fashion; and receive USB-PD traffic, BMC decoding of the preamble and SOP*, said SOP* comprises any or a combination of SOP, SOP_P, SOP_PP, SOP_P_debug, SOP_PP_debug and reset signals, wherein data received on the CC line with CRC calculation on a receiver path is based on the EOP detection with appropriate error handling at each stage of the USB-PD packets.

In another embodiment, the system can include a bypass path with the firmware hooks to the physical layer for interacting directly with the analogue front end connected to the pins of the USB-C port for reception and transmission of a USB-PD packet for debug and test purpose by looping back data received on any of a plurality of CC lines to remaining CC lines.

In another embodiment, the PD message accelerator blocks can be configured to break down received messages into data blocks and fields in a byte aligned fashion for ease of access through the firmware, wherein for message transmission, the firmware configured to populate fields as per requirement and the accelerator blocks from the message by aligning and forming appropriate data blocks.

In another embodiment, the system can include a firmware that implements a device policy manager in a lowest code size interacting with any or a combination of the PD message accelerator blocks, policy engine FSM and power source/sink component.

Another aspect of the present disclosure pertains to a method for implementing a low power, low code size, power delivery (PD) communication protocol on a USB-C port which is configured as Source, Sink, DRP or an eMarker. The method can include steps of dividing, using a dividing unit which includes register blocks comprising of control and status registers, functionality in a digital hardware portion through at least one block selected from finite state machines (FSMs), protocol timers and power delivery (PD) message accelerator blocks for reducing code size such that an implementation of the at least one selected block combined with a low code size firmware (FW) interacts, using a control unit operatively coupled to the dividing unit, with the hardware portion to facilitate compatibility with future updates in USB-PD specification, wherein, at least one of the FSMs configured to run at a predefined UI clock frequency (of 300 KHz) to enable low active power to the digital hardware portion, and wherein a plurality of standard power saving mechanism can be selected from any or a combination of clock gating and frequency reduction for clocks are implemented to enable the system to enter into a sleep state being defined as all blocks in the system being clock-gated to enable low power utilisation in the digital hardware portion.

Various objects, features, aspects and advantages of the inventive subject matter will become more apparent from the following detailed description of preferred embodiments, along with the accompanying drawing figures in which like numerals represent like components

BRIEF DESCRIPTION OF DRAWINGS

The diagrams are for illustration only, which thus is not a limitation of the present disclosure, and wherein:

FIG. 1 illustrates an exemplary block diagram of a system for implementing a low power, low code size, power delivery (PD) communication protocol on a USB-C port, in accordance with an embodiment of the present disclosure.

FIG. 2 illustrates an exemplary flow diagram of a method for implementing a low power, low code size, power delivery (PD) communication protocol on a USB-C port, in accordance with an embodiment of the present disclosure.

DETAILED DESCRIPTION

Figure 3A:
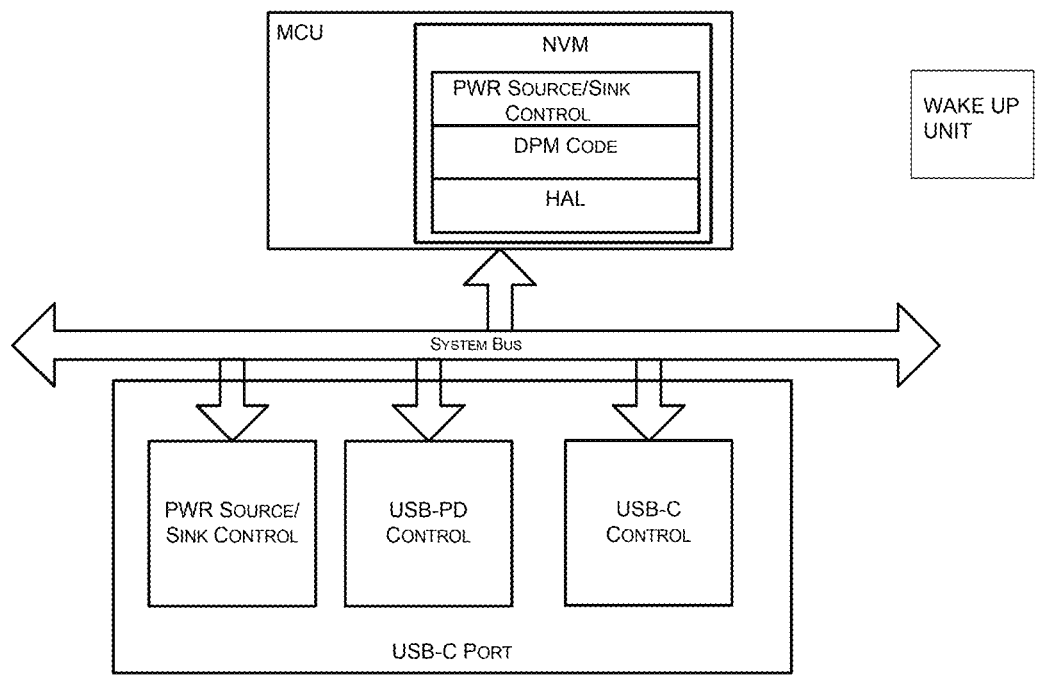
FIG. 3A illustrates an exemplary representation of high-level implementation of a single-port protocol, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to systems and methods for providing universal serial bus (USB) interface circuitry and/or power delivery (PD) protocols. More particularly, the present disclosure relates to a system and method for implementing low power, low code size PD communication protocols on a universal serial bus type-C(USB-C) port. The system provides reception of bi-phase mark coded (BMC) data on the CC line through a mix of analogue and digital components. The data edge detection happens at the analogue components while data interpretation is handled by the digital components.

An aspect of the present disclosure pertains to a system for implementing a low power, low code size power delivery (PD) communication protocol on a USB-C port which is configured as Source, Sink, DRP or an eMarker. The system includes a dividing unit that is configured to divide functionality in a digital hardware portion through at least one block selected from finite state machines (FSMs), protocol timers and power delivery (PD) message accelerator blocks for reducing code size such that an implementation of the at least one selected block combined with a low code size firmware (FW) interacts, using a control unit operatively coupled to the dividing unit, with the hardware portion to facilitate compatibility with future updates in USB-PD specification, and wherein at least one of the FSMs can be configured to run at a predefined UI clock frequency (of around 300 KHz) to enable the system to enter into a sleep state being defined as all blocks in the system being clock-gated to enable low power utilisation in the system.

An aspect of the present disclosure pertains to a method for implementing a low power, low code size, power delivery (PD) communication protocol on a USB-C port which is configured as Source, Sink, DRP or an eMarker. The method can include steps of dividing, using a dividing unit which includes register blocks comprising of control and status registers, functionality in a digital hardware portion through at least one block selected from finite state machines (FSMs), protocol timers and power delivery (PD) message accelerator blocks for reducing code size such that an implementation of the at least one selected block combined with a low code size firmware (FW) interacts, using a control unit operatively coupled to the dividing unit, with the hardware portion to facilitate compatibility with future updates in USB-PD specification, wherein, at least one of the FSMs configured to run at a predefined UI clock frequency (of 300 KHz) to enable low active power to the digital hardware portion, and wherein a plurality of standard power saving mechanism can be selected from any or a combination of clock gating and frequency reduction for clocks are implemented to enable the system to enter into a sleep state being defined as all blocks in the system being clock-gated to enable low power utilisation in the digital hardware portion.

FIG. 1 illustrates an exemplary representation of USB-C receptacle and cable plug, in accordance with an embodiment of the present disclosure.

According to an embodiment, the system 100 can include one or more processor(s) 102. The one or more processor(s) 102 can be implemented as one or more microprocessors, microcomputers, microcontrollers, digital signal processors, central processing units, logic circuitries, and/or any devices that manipulate data based on operational instructions. Among other capabilities, the one or more processor(s) 102 are configured to fetch and execute computer-readable instructions stored in a memory 104 of the system 100. The memory 104 can store one or more computer-readable instructions or routines, which can be fetched and executed to create or share the data units over a network service. The memory 104 can include any non-transitory storage device including, for example, volatile memory such as RAM, or non-volatile memory such as EPROM, flash memory, and the like.

Various components/units of the proposed system 100 can be implemented as a combination of hardware and programming (for example, programmable instructions) to implement their one or more functionalities as elaborated further themselves or using processors 102. In examples described herein, such combinations of hardware and programming can be implemented in several different ways. For example, the programming for the units can be processor executable instructions stored on a non-transitory machine-readable storage medium and the hardware for units can include a processing resource (for example, one or more processors), to execute such instructions. In the present examples, the machine-readable storage medium can store instructions that, when executed by the processing resource, implements the various units. In such examples, the system 100 can include the machine-readable storage medium storing the instructions and the processing resource to execute the instructions, or the machine-readable storage medium can be separate but accessible to the system 100 and the processing resource. In other examples, the units can be implemented by electronic circuitry. A database 120 can include data that is either stored or generated as a result of functionalities implemented by any of the other components/units of the proposed system 100.

In an embodiment, the system 100 for implementing a low power, low code size power delivery (PD) communication protocol on a USB-C port is disclosed. The system 100 provides dynamic power negotiation and allocation by providing data transfer on CC lines.

In an embodiment, the system 100 can include a dividing unit 108 and a control unit 106. The dividing unit 108 can be configured to divide functionality in a digital hardware portion 110 through at least one selected from finite state machines (FSMs) 112, protocol timers 114 and power delivery (PD) message accelerator blocks 116 for reducing code size such that an implementation of the at least one selected one combined with a low code size firmware (FW) interacts, using the control unit 106 operatively coupled to the dividing unit 108, with the hardware portion 110 to provide updates in an USB-PD specification.

In an embodiment, the at least one of the FSMs 112 can be configured to run at a predefined UI clock frequency to enable low active power to the system 100, wherein a plurality of standard power saving mechanisms selected from any or a combination of clock gating and frequency reduction for clocks are implemented to enable low power corresponding to the system 100.

In an embodiment, the FSM 112 is a type-C FSM such that corresponding at least one termination resistor selected from Rp, Rd and Ra is configured to enable controlling of appropriate register by a hardware of the FSM 112, and determine the type-C port connection and disconnection detection and orientation.

In an embodiment, the system 100 can include one or more hardware debouncing blocks that can be configured to detect source CC configuration channel (CC) pin selected from any or a combination of Rd (src.Rd), Rp (src.Rp) and Ra (src.Ra) whenever an USB-C port is connected or disconnected, wherein an alert is provided, when the connection or disconnection is detected, to the FW for taking appropriate action.

It may be appreciated that Ra, Rd and Rp are resistances exposed on the CC line, which may be implemented in an analogue module. In an exemplary instance of the present disclosure, the analogue module may include comparators with configurable thresholds, configurable pull-up and pull-down resistances and transistor switches. The analogue module is configured for determining connection and/or disconnection accurately based on the termination voltages, along with transmitting/receiving BMC data on CC line of type-C connector pin. Typically, Rp is a pull-up resistance in the source implementation; Rd is the pull-down resistance in the sink implementation; and Ra is a pull-down resistance on the CC line exposed by the cable implementation. A combination of Rp and Rd can be used for a dual role power (DRP) implementation.

It would be appreciated that the values of Rd (src.Rd), Rp (src.Rp) and Ra (src.Ra) can be obtained from a specification of the respective USB Type-C port. An exemplary specification can be the Universal Serial Bus Type-C Cable and Connector Specification (rel. 2.0), as provided by the USB Implementors Forum.

In an embodiment, the system 100 can include a bypass path through the firmware control to bypass and control a plurality of enables, at least one of Rp, Rd and Ra, and observe status of the firmware to incorporate USB-C specification changes.

In an embodiment, the system 100 can include an optimized policy engine state machine that can be operatively coupled with hooks of the firmware and configured to indicate a received traffic to the firmware, initiation of the USB-PD traffic, from the firmware hooks, on a connected CC line through a protocol layer and a physical layer of the digital hardware portion 110, wherein a plurality of policy engine timers are optimized and implemented, through a set of hardware timers, VDM sender response timer, no response timer, and wherein message related timers are implemented through a generic, configurable timer with a value loaded from FSM and have a provision to load from firmware, depending on the concurrency of the timers across all the PD message flows.

In an embodiment, the system 100 can include a bypass path with configurable states, configurable transition arcs, configurable timers and configurable expected packets implemented in the policy engine through the firmware hooks to the policy engine for interacting with the protocol layer directly in case of addition of new messages and flows in the USB-PD specification.

In an embodiment, the protocol layer with firmware hooks can be configured to: auto-send goodCRC during successful message reception indication from the physical layer, check an identification (ID) of a received message for proper communication; increment a message ID counter on successful transmission after receiving the goodCRC; discard long PD messages; compute and append the message ID during communication with a port partner on the message being transmitted; provide the message formed after appending the message ID to the hardware implemented physical layer for further transmissions, wherein a SinkTx timer, CRC reception timer and hard-reset completion timers from PD specification are implemented through a re-usable timer interface and configurable values from firmware such that reset values of the timers are set to the predefined value of the timers.

In an embodiment, the system 100 can include a bypass path with the firmware hooks to the protocol layer for interacting with the physical layer directly for adding a message header as required by the physical layer for transmitting and receiving data on the CC lines for debug purposes and for implementing any change across the physical layer.

In an embodiment, the system 100 can include a physical layer with firmware hooks configured to: transmit the USB-PD traffic with a preamble, start-of-packet (SOP), 4B to 5B conversion and end-of-packet (EOP), compute and append CRC on data received from higher layers to be transmitted on the CC line in the bi-phase mark coded (BMC) fashion; and receive USB-PD traffic, BMC decoding of the preamble and SOP, wherein data received on the CC line with CRC calculation on a receiver path is based on the EOP detection with appropriate error handling at each stage of the USB-PD packets.

In an embodiment, the system 100 can include a bypass path with the firmware hooks to the physical layer for interacting directly with pins of the USB-C port for reception and transmission of a USB-PD packet for debug and test purpose by looping back data received on any of a plurality of CC lines to remaining CC lines.

In an embodiment, the PD message accelerator blocks 116 can be configured to break down received messages into data blocks and fields in a byte aligned fashion for ease of access through the firmware, wherein for message transmission, the firmware configured to populate fields as per requirement and the accelerator blocks from the message by aligning and forming appropriate data blocks.

In an embodiment, the system 100 can include a firmware implementing a device policy manager in a lowest code side interacting with any or a combination of the PD message accelerator blocks 116, policy engine FSM and power source/sink component.

In an exemplary embodiment, policies of USB-C PD specification can be implemented in a software, hardware or a combination of software and hardware methodologies.

In an embodiment, the system 100 reduces memory size (i.e. flash memory by reducing steps of software and by implementing components such as policy engine, protocol layer (both low and high protocol layer) and physical layer in one hardware). Some part of device policy manager is implemented as software in the control unit 106 (such as micro-controller) in order to optimize the software. The policy engine is optimized by reducing timers (from 20-30 timers to 3-7 timers). These 3-7 timers are configured to implement task performed by all the 20-30 timers previously. Hence, hardware optimization is also provided along with software optimization.

In an embodiment, the system 100 provides bypass paths at each level i.e. policy engine can be bypassed at policy engine level. There is a bypass path present at protocol layer and bypass path present at physical layer as well.

In another embodiment, the system 100 can include a wake-up unit 118 configured to activate the system from the sleep state on detection of data edge on configuration channel, and wherein the wake up unit is configured to run at least four times of the clock frequency to facilitate quick activation of the system without missing on any data bits.

Although the proposed system 100 has been elaborated as above to include all the main units, it is conceivable that actual implementations are well within the scope of the present disclosure, which can include without any limitation, only a part of the proposed units or a combination of those or a division of those into sub-units in various combinations across multiple devices that can be operatively coupled with each other, including in the cloud. Further, the units can be configured in any sequence to achieve objectives elaborated. Further, the proposed system 100 can be configured in a computing device or across a plurality of computing devices operatively connected with each other, wherein the computing devices can be any of a computer, a laptop, a smart phone, an Internet enabled mobile device and the like. Therefore, all possible modifications, implementations and embodiments of where and how the proposed system 100 is configured are well within the scope of the present disclosure.

FIG. 2 illustrates an exemplary flow diagram of a method for implementing a low power, low code size, power delivery (PD) communication protocol on a USB-C port, in accordance with an embodiment of the present disclosure.

According to an embodiment, the method 200 can include at a step 202, dividing, using a dividing unit, functionality in a digital hardware portion through at least one selected from finite state machines (FSMs), protocol timers and power delivery (PD) message accelerator blocks for reducing code size such that an implementation of the at least one selected one combined with a low code size firmware (FW) interacts, using a control unit operatively coupled to the dividing unit, with the hardware portion to provide updates in an USB-PD specification, wherein at least one of the FSMs configured to run at a predefined UI clock frequency (of 300 KHz) to enable low active power to the digital hardware portion, and wherein a plurality of standard power saving mechanisms selected from any or a combination of clock gating and frequency reduction for clocks are implemented to enable low power corresponding to the digital hardware portion.

In another embodiment, with additional RAM and an incremental increase in code size, the proposed protocol can be scaled to multi-port expansion.

In an embodiment, USB power delivery (PD) can be a half-duplex serial communication layered protocol where the communication between the port partners can be provided through CC lines. The data that is transmitted on CC line is Bi-Phase Mark Coded (BMC) for the ease of communication. The system 100 and method 200 can be employed to detect data traffic by implementing an analogue block and a digital block for complete detection of the CC data. The data edge detection happens at the analogue block while data interpretation is handled by the digital block.

FIG. 3A illustrates an exemplary representation of high-level implementation of a single-port protocol, in accordance with an embodiment of the present disclosure. The implementation includes a microcontroller unit, which has an NVM storing the device policy manager (DPM), the power source and sink control, and a hardware abstraction layer (HAL); a USB-C port that includes USB-C control functionality, USB-PD control functionality and power source/sink control functionality operatively coupled with the microcontroller unit, through a system bus; and a wake-up block. The HAL is configured to interact with the hardware blocks such as the USB-C port.

Figure 3B:
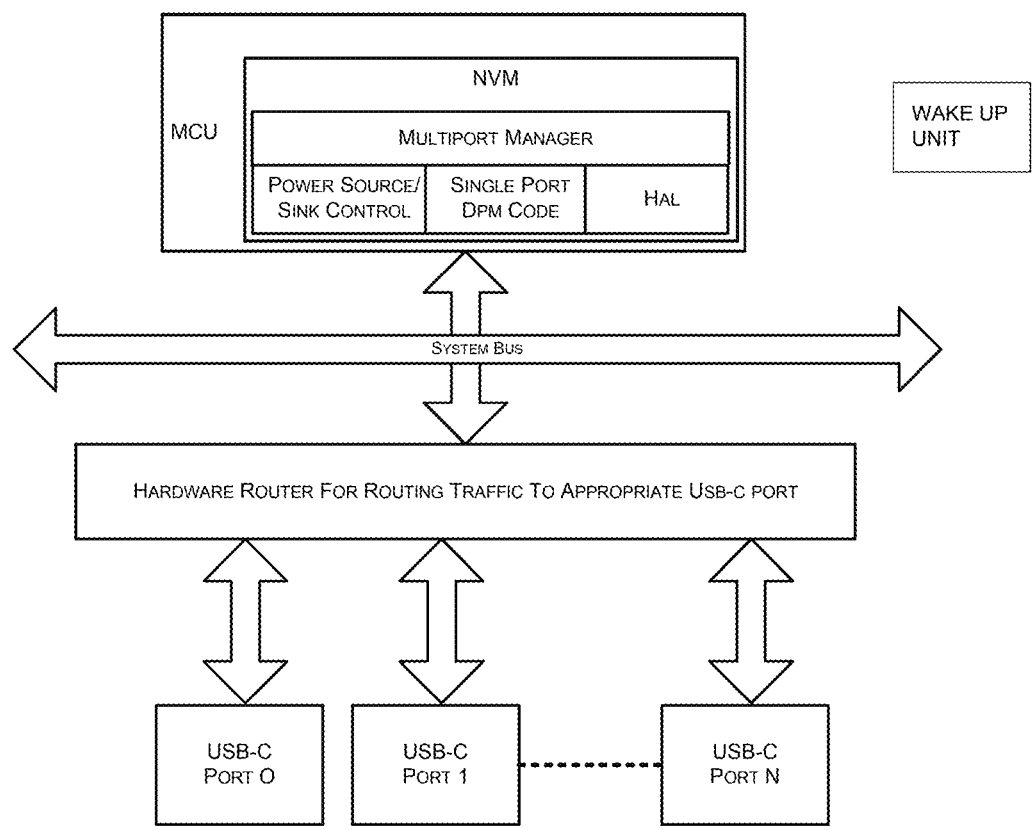
FIG. 3B illustrates an exemplary representation of high-level implementation of a multi-port protocol, in accordance with an embodiment of the present disclosure.

FIG. 3B illustrates an exemplary representation of high-level implementation of a multi-port protocol, in accordance with an embodiment of the present disclosure. The implementation includes a microcontroller unit, which has an NVM storing the device policy manager (DPM), the power source and sink control, and a hardware abstraction layer (HAL); a USB-C port that includes USB-C control functionality, USB-PD control functionality and power source/sink control functionality operatively coupled with the microcontroller unit, through a system bus; and a wake-up block. The HAL is configured to interact with the hardware blocks such as the USB-C port. The implementation further includes a multi-port manager in the NVM and a hardware router for issuing commands to a respective USB-C port, when multiple USB-C ports are present. The hardware router is configured to route traffic from control unit to a USB-PD controller of a corresponding USB-C port being used, which helps in accelerating the traffic routing to corresponding USB-C port and reducing the computer code size in a multiport system.

Figure 4:
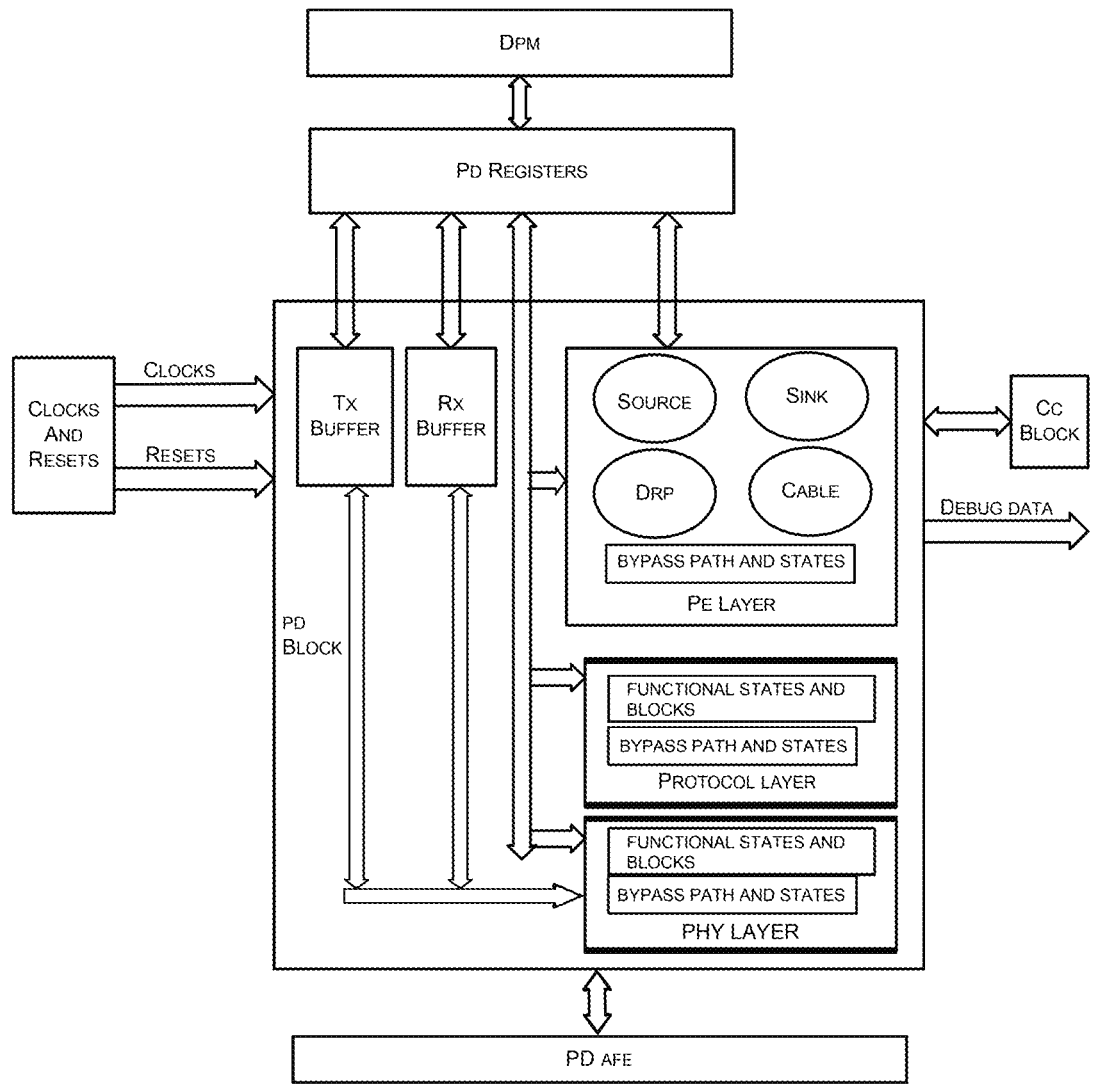
FIG. 4 illustrates an exemplary representation of power delivery (PD) and type-C break up corresponding to the FIG. 2, in accordance with an embodiment of the present disclosure.

FIG. 4 illustrates an exemplary representation of power delivery (PD) and type-C break up corresponding to the FIG. 2, in accordance with an embodiment of the present disclosure. The power delivery implementation includes a policy engine, which can be configured to any of source, sink, DRP and cable, along with a protocol layer, PHY layer, and appropriate TX and RX buffers, with relevant bypass states and paths. The functionality of power delivery is controlled by DPM through power delivery registers. The power delivery implementation interacts with the CC block and power delivery analogue front end (AFE). The clocks and resets for the power delivery implementation can be provided by the clocks and resets block.

Figure 5:
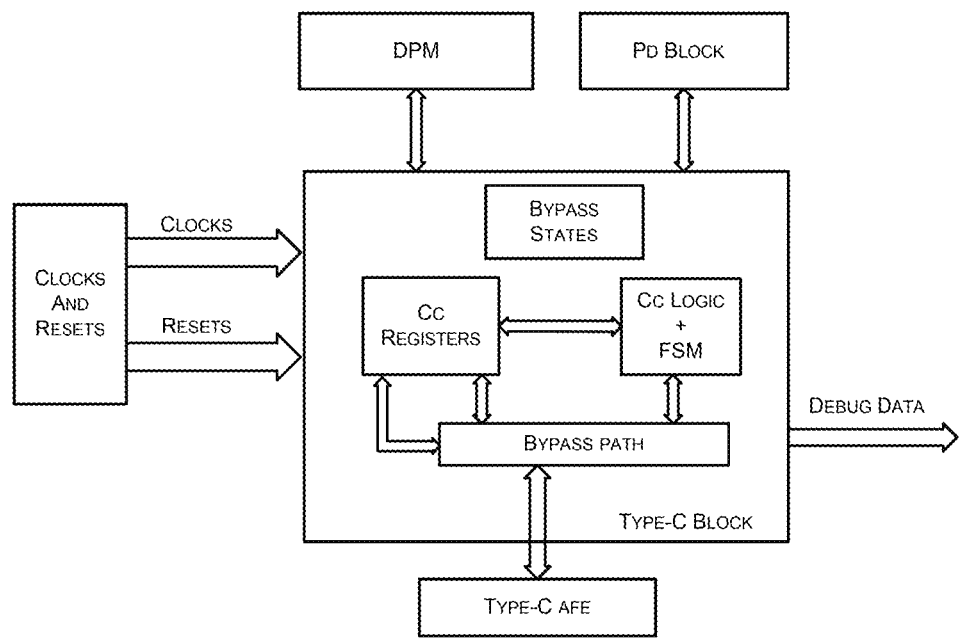
FIG. 5 illustrates an exemplary block diagram representation of CC block hardware implementation and bypass mechanism, in accordance with an embodiment of the present disclosure.

FIG. 5 illustrates an exemplary block diagram representation of CC block hardware implementation and bypass mechanism, in accordance with an embodiment of the present disclosure. The implementation includes a Type-C block, which further includes a CC register and CC logic, along with FSM. The Type-C block further includes relevant bypass states and paths. The functionality of Type-C block is controlled by DPM through Type-C registers. The Type-C block is configured to interact with the Type-C analogue front end (AFE) and the power delivery block. The clocks and resets for the implementation of Type-C block can be provided by the clocks and resets block.

Figure 6:
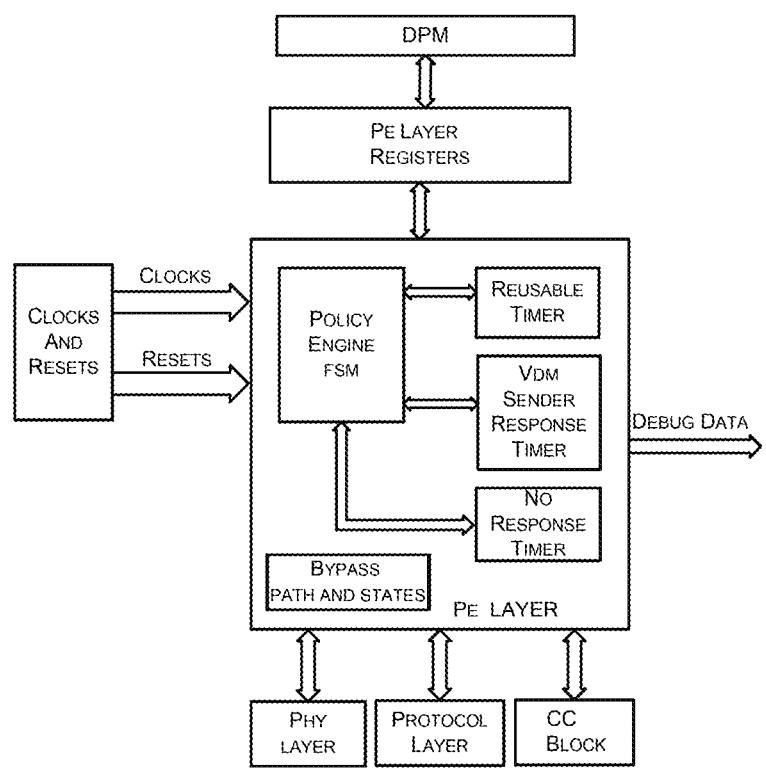
FIG. 6 illustrates an exemplary hardware implementation of policy engine and bypass mechanism, in accordance with an embodiment of the present disclosure.

FIG. 6 illustrates an exemplary hardware implementation of policy engine and bypass mechanism, in accordance with an embodiment of the present disclosure. The policy engine is implemented with 3-7 timers instead of using around 30 timers. One timer is reusable timer and second timer is no response timer. The reusable timer is used for other timers as well. The policy engine comprises reusable timer, no response timer, set of registers running in control unit (monitoring and control unit, microcontroller etc.) and utilized to configure/to provide sequencing accordingly based on different inputs from firmware. The firmware utilizes 4 to 8 KB thus saving flash or NVM memory drastically. The use of lower flash memory also results in a smaller area.

Figure 7:
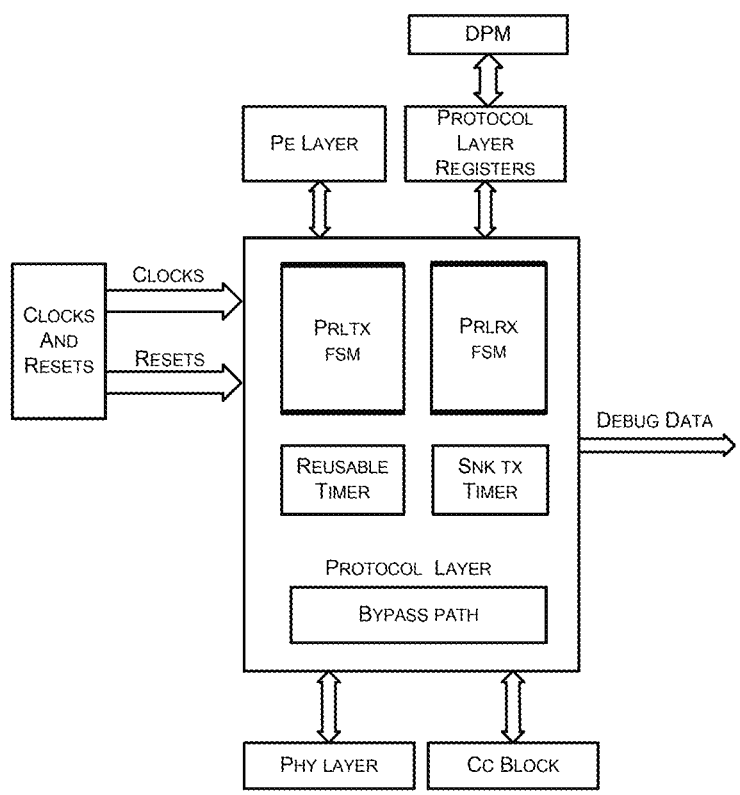
FIG. 7 illustrates a protocol layer hardware implementation and bypass mechanism, in accordance with an embodiment of the present disclosure.

FIG. 7 illustrates a protocol layer hardware implementation and bypass mechanism, in accordance with an embodiment of the present disclosure. The implementation includes a protocol transmission FSM (PRLTX FSM), a protocol reception FSM (PRLRX FSM), a sink TX timer, a reusable timer and an appropriate bypass path. The protocol layer is controlled by DPM through a set of protocol layer registers. The protocol layer interacts with a policy engine, Type-C block and PHY layer. The clocks and resets for the implementation of protocol layer hardware can be provided by the clocks and resets block.

Figure 8:
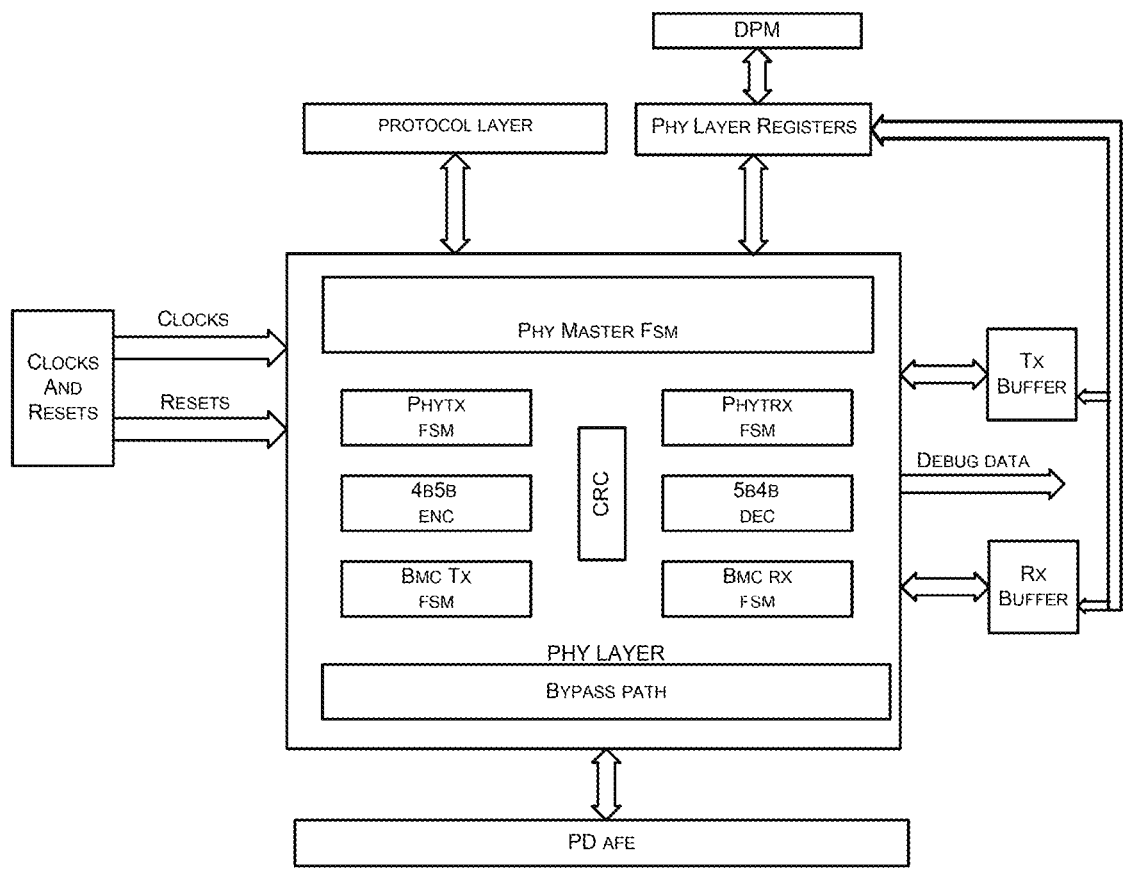
FIG. 8 illustrates an exemplary physical layer hardware implementation and bypass mechanism, in accordance with an embodiment of the present disclosure.

FIG. 8 illustrates an exemplary physical layer hardware implementation and bypass mechanism, in accordance with an embodiment of the present disclosure. The implementation includes a physical layer transmission FSM (PHYTX FSM), which is configured to interact with a 4B5B encoder and the BMC TX FSM. The implementation further includes a physical layer reception FSM, which is configured to interact with the 5B4B decoder and the BMC RX FSM. The functioning of the PHYTX FSM and the PHYRX FSM are controlled by the PHY master FSM. The CRC calculation is performed by a common CRC block for both transmission and reception paths. The implementation additionally includes an appropriate bypass path. The physical layer is controlled by the DPM through a set of physical layer registers. The physical layer also interacts with the protocol layer, PD analogue front end, TX and RX buffers. The clocks and resets for the implementation of physical layer hardware can be provided by the clocks and resets block.

Figure 9:
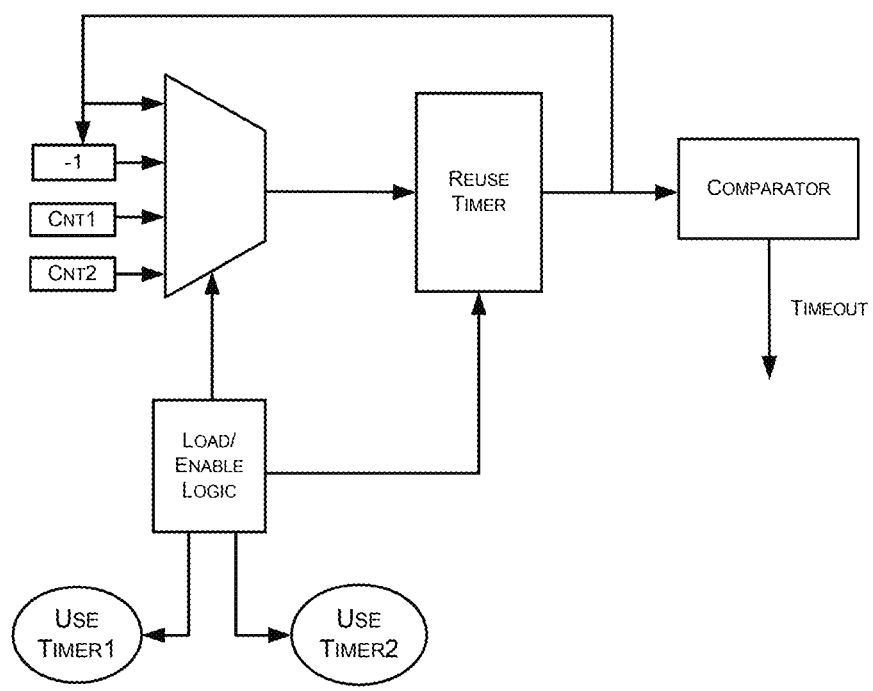
FIG. 9 illustrates an exemplary reusable and configurable timer architecture, in accordance with an embodiment of the present disclosure.

FIG. 9 illustrates an exemplary reusable and configurable timer architecture, in accordance with an embodiment of the present disclosure. The reusable timer architecture shown in FIG. 9 has been implemented in policy engine FSM and in protocol layer (as shown in FIG. 6). The timer values loaded in the timers are provided through different timer registers. In the present instance, the different timer registers can be USE TIMER1 and USE TIMER2, and they are appropriately loaded when instructed by the appropriate FSM (of any of policy engine and protocol layer). The comparator compares the timer output with a predefined fixed value to indicate a time-out.

Thus, it will be appreciated by those of ordinary skill in the art that the diagrams, schematics, illustrations, and the like represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function can be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention can be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention can be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The present disclosure provides a system for implementing a low power, low code size power delivery (PD) communication protocol on a USB-C port, with both hardware and software optimization.

The present disclosure provides a method for implementing a low power, low code size power delivery (PD) communication protocol on USB-C port, with reduced memory size and processing time.

The present disclosure provides a reliable, optimized and efficient system and method for implementing a low power, low code size power delivery (PD) communication protocol on a USB-C port.

The present invention provides a robust system and method for detection of configuration channel (CC) data traffic in USB interface.

The present invention provides an optimized system which can be extended for supporting PD on multiple USB-C port through addition of minimal hardware and firmware.

What is claimed is:

1. A system for implementing a low power, low code size power delivery (PD) communication protocol on a USB-C port, which is configured as Source, Sink, DRP or an eMarker, the system comprising:
- a dividing unit configured to divide functionality in a digital hardware portion through at least one block selected from finite state machines (FSMs), protocol timers and power delivery (PD) message accelerator blocks for reducing code size such that an implementation of the at least one selected block combined with a low code size firmware (FW) interacts, using a control unit operatively coupled to the dividing unit, with the hardware portion to facilitate compatibility with future updates in USB-PD specification,
- wherein at least one of the FSMs is configured to run at a predefined UI clock frequency to enable low active power to the system, and
- wherein a plurality of standard power saving mechanisms selected from any or a combination of clock gating and frequency reduction for clocks are implemented to enable the system to enter into a sleep state being defined as all blocks in the system being clock-gated to enable low power utilisation in the system.

2. The system as claimed in claim 1, wherein the system comprises a wake-up unit configured to activate the system from the sleep state on detection of data edge on configuration channel, and wherein the wake up unit is configured to run at least four times of the clock frequency to facilitate quick activation of the system without missing any data bits.

3. The system as claimed in claim 1, wherein the system comprises one or more USB-C ports, said system configured for implementation in any or all of the one or more USB-C ports, with addition of suitable hardware required for implementation of said system for the one or more second USB-C ports.

4. The system as claimed in claim 3, wherein the system comprises a hardware router configured to route traffic from control unit to a USB-PD controller of a corresponding USB-C port being used.

5. The system as claimed in claim 1, wherein the FSM is a type-C FSM such that corresponding at least one termination resistor selected from Rp, Rd and Ra is configured to enable controlling of appropriate register by a hardware of the FSM and determine the type-C port connection and disconnection detection and orientation.

6. The system as claimed in claim 5, wherein the system comprises one or more configurable hardware debouncing blocks configured to detect source CC configuration channel (CC) pin selected from any or a combination of Rd (src.Rd), Rp (src.Rp) and Ra (src.Ra) whenever an USB-C port is connected or disconnected, wherein an alert is provided, when the connection or disconnection is detected, to the FW for taking appropriate action.

7. The system as claimed in claim 5, wherein the system comprises a bypass path through the firmware control to bypass and control a plurality of enables, at least one of Rp, Rd and Ra, and observe status of the firmware to incorporate USB-C specification changes.

8. The system as claimed in claim 1, wherein the system comprises an optimized policy engine state machine, where multiple functionally similar states are merged into common states, operatively coupled with hooks of the firmware and configured to indicate a received traffic to the firmware, initiation of the USB-PD traffic, from the firmware, on a connected CC line through a protocol layer and a physical layer of the digital hardware portion, wherein a plurality of policy engine timers are optimized and implemented, through a set of hardware timers, VDM sender response timer, no response timer, and wherein message related timers are implemented through a generic, configurable shared timer with a default value loaded from FSM and have a provision to load from firmware, depending on the concurrency of the timers across all the PD message flows.

9. The system as claimed in claim 8, wherein the system comprises a bypass path with configurable states, configurable transition arcs, configurable shared timers, configurable CC control and configurable expected packets, which transmit data, implemented in the policy engine through the firmware hooks to the policy engine for interacting with the protocol layer directly in case of addition of new messages and flows in the USB-PD specification.

10. The system as claimed in claim 8, wherein the protocol layer with firmware hooks configured to: auto-send GoodCRC during successful message reception indication from the physical layer, check an identification (ID) of a received message for proper communication; increment a message ID counter on successful transmission after receiving the goodCRC; discard long PD messages; compute and append the message ID during communication with a port partner on the message being transmitted; provide the message formed after appending the message ID to the hardware implemented physical layer for further transmissions, wherein a SinkTx timer, CRC reception timer and hard-reset completion timers from PD specification are implemented through a re-usable timer interface and configurable values from firmware such that reset values of the timers are set to the predefined value of the timers.

11. The system as claimed in claim 1, wherein the system comprises a bypass path with the firmware hooks to the protocol layer for interacting with the physical layer directly for adding a message header as required by the physical layer for transmitting and receiving data on the CC lines for debug purposes and for implementing any change across the physical layer.

12. The system as claimed in claim 1, wherein the system comprises a physical layer with firmware hooks configured to: transmit the USB-PD traffic with a preamble, start-of-packet (SOP), 4B to 5B conversion and end-of-packet (EOP), compute and append CRC on data received from higher layers to be transmitted on the CC line in the bi-phase mark coded (BMC) fashion; and receive USB-PD traffic, BMC decoding of the preamble and SOP*, said SOP* comprises any or a combination of SOP, SOP_P, SOP_PP, SOP_P_debug, SOP_PP_debug and reset signals, wherein data received on the CC line with CRC calculation on a receiver path is based on the EOP detection with appropriate error handling at each stage of the USB-PD packets.

13. The system as claimed in claim 12, wherein the system comprises a bypass path with the firmware hooks to the physical layer for interacting directly with the analogue front end connected to the pins of the USB-C port for reception and transmission of a USB-PD packet for debug and test purpose by looping back data received on any of a plurality of CC lines to remaining CC lines.

14. The system as claimed in claim 1, wherein the PD message accelerator blocks configured to break down received messages into data blocks and fields in a byte aligned fashion for ease of access through the firmware, wherein for message transmission, the firmware configured to populate fields as per requirement and the accelerator blocks from the message by aligning and forming appropriate data blocks.

15. The system as claimed in claim 1, wherein the system comprises a firmware implementing a device policy manager in a lowest code size interacting with any or a combination of the PD message accelerator blocks, policy engine FSM and power source/sink component.

16. A method for implementing a low power, low code size, power delivery (PD) communication protocol on a USB-C port which is configured as Source, Sink, DRP or an eMarker, said method comprising steps of:

dividing, using a dividing unit, functionality in a digital hardware portion through at least one block selected from finite state machines (FSMs), protocol timers and power delivery (PD) message accelerator blocks for reducing code size such that an implementation of the at least one selected block combined with a low code size firmware (FW) interacts, using a control unit operatively coupled to the dividing unit, with the hardware portion to facilitate compatibility with future updates in USB-PD specification, wherein at least one of the FSMs configured to run at a predefined UI clock frequency (of 300 KHz) to enable low active power to the digital hardware portion, and wherein a plurality of standard power saving mechanisms selected from any or a combination of clock gating and frequency reduction for clocks are implemented to enable the system to enter into a sleep state being defined as all blocks in the system being clock-gated to enable low power utilisation in the digital hardware portion.

* * * * *